United States Patent
Dozen et al.

(10) Patent No.: US 11,551,865 B2
(45) Date of Patent: Jan. 10, 2023

(54) ELECTRONIC COMPONENT

(71) Applicant: Murata Manufacturing Co., Ltd., Kyoto-fu (JP)

(72) Inventors: Tomohiro Dozen, Nagaokakyo (JP); Yasuo Matsumoto, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 17/124,424

(22) Filed: Dec. 16, 2020

(65) Prior Publication Data

US 2021/0193386 A1    Jun. 24, 2021

(30) Foreign Application Priority Data

Dec. 20, 2019  (JP) .............................. JP2019-230017

(51) Int. Cl.
*H01G 4/008* (2006.01)
*B32B 15/01* (2006.01)
*C22C 9/00* (2006.01)
*C22C 13/00* (2006.01)
*C22C 19/03* (2006.01)
*H01G 4/232* (2006.01)

(52) U.S. Cl.
CPC ............. *H01G 4/008* (2013.01); *B32B 15/01* (2013.01); *C22C 9/00* (2013.01); *C22C 13/00* (2013.01); *C22C 19/03* (2013.01); *H01G 4/232* (2013.01)

(58) Field of Classification Search
None
See application file for complete search history.

(56) References Cited

U.S. PATENT DOCUMENTS

| | | | | |
|---|---|---|---|---|
| 6,195,248 B1* | 2/2001 | Kunishi | ................ | H01G 4/232 361/321.5 |
| 6,243,254 B1* | 6/2001 | Wada | ................... | H01G 4/1227 361/311 |
| 2009/0310277 A1* | 12/2009 | Kayatani | ................ | H01G 4/005 361/306.3 |
| 2013/0294006 A1* | 11/2013 | Kang | .................... | H01G 4/224 361/301.4 |
| 2014/0192453 A1* | 7/2014 | Hong | ....................... | H01G 4/12 361/301.4 |
| 2015/0054388 A1* | 2/2015 | Itagaki | ................... | H01C 7/008 310/364 |
| 2016/0379758 A1* | 12/2016 | Otani | ..................... | H01G 4/005 361/301.4 |
| 2018/0286594 A1* | 10/2018 | Kim | ........................ | H01G 4/248 |
| 2019/0088415 A1* | 3/2019 | Takashima | ............. | H01G 4/008 |

FOREIGN PATENT DOCUMENTS

| | | | |
|---|---|---|---|
| CN | 111354549 A | | 6/2020 |
| JP | 2000077253 A | | 3/2000 |
| JP | 2003303787 A | * | 10/2003 |
| JP | 7031574 B2 | | 3/2022 |

OTHER PUBLICATIONS

Machine translation via Espacenet of JP2003303787A with Abstract (translated Jul. 1, 2021) (Year: 2003).*

* cited by examiner

*Primary Examiner* — Elizabeth Collister
(74) *Attorney, Agent, or Firm* — Studebaker & Brackett PC

(57) ABSTRACT

An electronic component includes a component body, a base electrode that has a surface exposed from the component body and contains at least one of silver and copper, an alloy layer deposited on the surface of the base electrode, and a nickel layer deposited on a surface of the alloy layer. The material of the alloy layer is an alloy containing nickel and tin.

7 Claims, 3 Drawing Sheets

FIG. 6

| THICKNESS OF ALLOY PLATING LAYER (μm) | 0.0 | 0.3 | 0.4 | 0.8 | 1.1 |
|---|---|---|---|---|---|
| DELAMINATION FAILURE RATIO (%) | 23 | 0 | 0 | 0 | 0 |

ELECTRONIC COMPONENT

CROSS-REFERENCE TO RELATED APPLICATION

This application claims benefit of priority to Japanese Patent Application No. 2019-230017, filed Dec. 20, 2019, the entire content of which is incorporated herein by reference.

BACKGROUND

Technical Field

The present disclosure relates to an electronic component.

Background Art

In an electronic component described in Japanese Unexamined Patent Application Publication No. 2000-77253, base electrodes are deposited on the surface of a component body. The material of the base electrodes contains silver. A nickel layer is deposited on the surface of each base electrode. Moreover, a tin layer is deposited on the surface of the nickel layer.

SUMMARY

When excessively large stress is applied to the electronic component described in Japanese Unexamined Patent Application Publication No. 2000-77253, the nickel layer may be delaminated from the base electrodes.

In one embodiment of the electronic component of the present disclosure includes a component body; a base electrode that has a surface exposed from the component body and contains at least one of silver and copper; an alloy layer deposited on the surface of the base electrode; and a nickel layer deposited on a surface of the alloy layer. The material of the alloy layer is an alloy containing nickel and tin.

In the above structure, the alloy layer is interposed between the base electrode and the nickel layer. Therefore, the nickel layer can be deposited on the front side of the base electrode with no interface between the base electrode and the nickel layer. Moreover, since the adhesion between the alloy layer and the base electrode and the adhesion between the alloy layer and the nickel layer are reasonably high, delamination can be prevented.

Other features, elements, characteristics and advantages of the present disclosure will become more apparent from the following detailed description of some embodiments of the present disclosure with reference to the attached drawings.

BRIEF DESCRIPTION OF THE DRAWINGS

FIG. 6 is a table showing the results of delamination evaluation.

DETAILED DESCRIPTION

Figure 1:
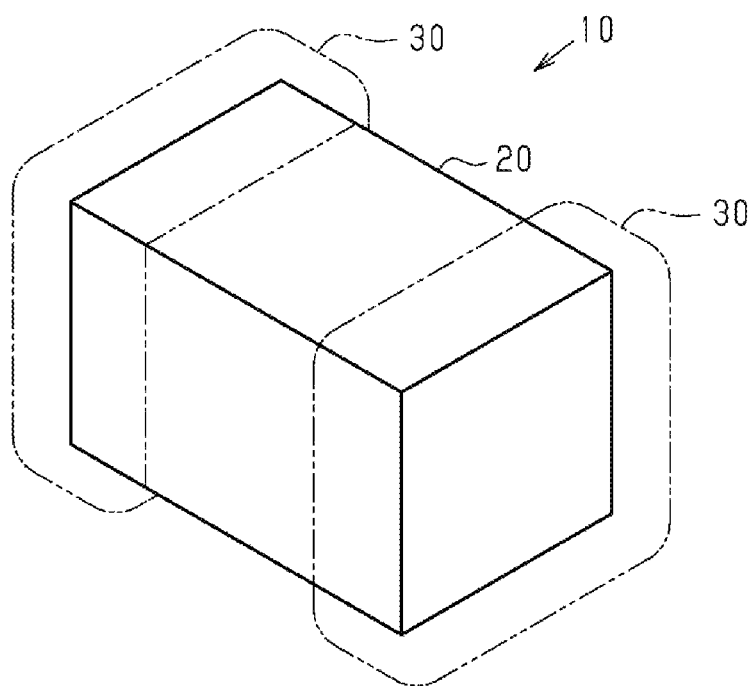
FIG. 1 is a perspective view of an electronic component.

One embodiment of an electronic component will be described. Components shown in the drawings may be enlarged in order to facilitate the understanding thereof. The dimensional ratios of components in a drawing may differ from the actual dimensional ratios or from the dimensional ratios in another drawing.

As shown in FIG. 1, the electronic component is, for example, an inductor component 10. The inductor component 10 includes a component body 20. The component body 20 has a substantially rectangular parallelepipedic shape. Although not illustrated, the component body 20 is composed of an inductor wiring line formed of an electrically conductive material and a magnetic body formed of a magnetic material and covering the inductor wiring line. The component body 20 is a sintered body. The inductor wiring line extends inside the magnetic body. A first end of the inductor wiring line is exposed from the magnetic body at an end face of the component body 20 that is located on a first end side in its longitudinal direction. A second end of the inductor wiring line is exposed from the magnetic body at an end face of the component body that is located on a second end side in its longitudinal direction.

As shown in FIG. 1, an electrode portion 30 is deposited on the surface of the component body 20 in a portion on the first end side of the center with respect to the longitudinal direction. Similarly, another electrode portion 30 is deposited on the surface of the component body 20 in a portion on the second end side of the center with respect to the longitudinal direction. Specifically, each of the electrode portions 30 is a so-called five-face electrode covering five surfaces of the component body 20. Each of the two electrode portions 30 does not reach the center of the component body 20 with respect to the longitudinal direction. Therefore, the two electrode portions 30 are not in contact with each other and are spaced apart in the longitudinal direction.

Figure 2:
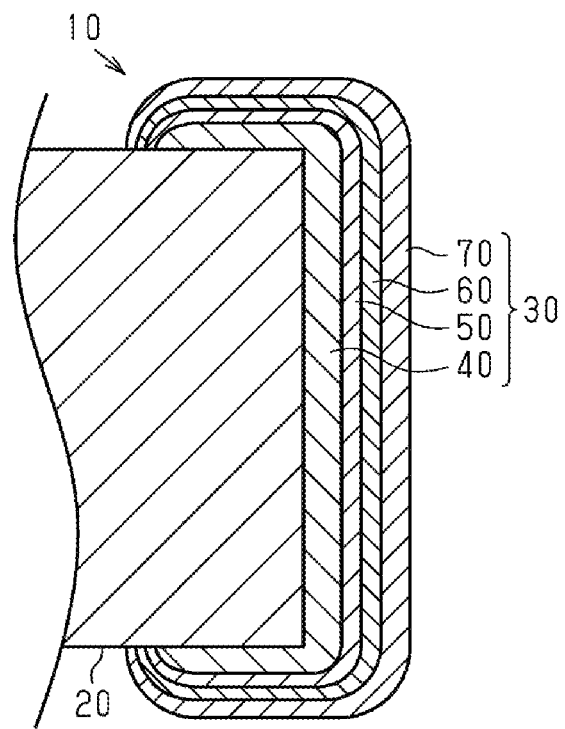
FIG. 2 is a partial cross-sectional view of the electronic component.

As shown in FIG. 2, each electrode portion 30 includes a base electrode 40, an alloy plating layer 50, a nickel plating layer 60, and a tin plating layer 70 that are disposed sequentially on the component body 20.

The base electrode 40 is deposited on the surface of the component body 20. The material of the base electrode 40 is a mixture of silver and glass, and its electrical conductivity is higher than that of the component body 20. Instead of silver, copper may be used as the material of the base electrode 40. Although not illustrated, the base electrode 40 is connected to the inductor wiring line of the component body 20. The glass is exposed at part of the surface of the base electrode, and the glass particles protrude partially from the surface. The silver is exposed at part of the surface of the base electrode 40, and the silver particles protrude partially from the surface. Therefore, the surface of the base electrode 40 is microscopically irregular. Moreover, tin is contained in part of the front side of the base electrode 40.

The alloy plating layer 50 is deposited on the surface of the base electrode 40. The alloy plating layer 50 covers the entire surface of the base electrode 40. The alloy plating layer 50 is formed of $Ni_3Sn$. Specifically, the alloy forming the alloy plating layer 50 is an alloy of nickel and tin, and the compositional ratio of nickel to tin is about 3:1. Therefore, in the alloy plating layer 50, the molar ratio of nickel is about 2.5 times or more and about 3.5 times or less (i.e., from about 2.5 times to about 3.5 times) of the molar ratio of tin. The thickness of the alloy plating layer 50 is about 0.3 μm or more. In FIG. 2, the thickness of the alloy plating layer 50 illustrated is exaggerated. The thickness of the alloy plating layer 50 is determined as follows. In a cross section of the component body 20 that is taken in its longitudinal direction and includes an end face of the component body 20, the size of the alloy plating layer 50 in the deposition direction is measured at three points in a region excluding ridgelines of the component body 20, and the average of the three measured values is used as the thickness.

The nickel plating layer 60 is deposited on the surface of the alloy plating layer 50. The nickel plating layer 60 covers the entire surface of the alloy plating layer 50. The material of the nickel plating layer 60 is nickel. Therefore, in the present embodiment, the ratio of nickel in the nickel plating layer 60 is about 100% and is larger than the ratio of nickel in the alloy plating layer 50. The thickness of the nickel plating layer 60 is about 4.0 μm. The phrase "the ratio of nickel is about 100%" means that the nickel plating layer 60 is allowed to contain, in addition to nickel, other materials such as impurities.

The tin plating layer 70 is deposited on the surface of the nickel plating layer 60. The tin plating layer 70 covers the entire surface of the nickel plating layer 60. The material of the tin plating layer 70 is tin. The thickness of the tin plating layer 70 is about 6.0 μm.

Next, a method for depositing the electrode portions 30 of the inductor component 10 will be described.

First, baking treatment is performed. Specifically, a conductive paste composed of silver, glass, and an organic solvent is applied to first and second end portions of the component body 20 and heated to high temperature. During the baking treatment, the organic solvent volatilizes, and the silver and glass are sintered. The base electrodes 40 formed of the silver and glass are thereby deposited on the first and second end portions of the component body 20.

Next, the alloy plating layer 50 is formed on the surface of each base electrode 40 by electroplating. Specifically, the component body 20 with the base electrodes 40 deposited thereon is immersed in a nickel plating solution containing tin dissolved therein, and a prescribed current is applied. The alloy plating layer 50 is thereby formed on the surface of each base electrode 40. Tin diffuses into part of the front side of the base electrode 40. Therefore, a portion containing tin is formed in part of the front side of the base electrode 40. After heat treatment in the process for producing the inductor component 10, the alloy plating layer 50 is formed of $Ni_3Sn$.

Next, the nickel plating layer 60 is formed on the surface of the alloy plating layer 50 by electroplating. Specifically, the component body 20 with the alloy plating layer 50 deposited thereon is immersed in a nickel plating solution with no tin dissolved therein, and a prescribed current is applied. The nickel plating layer 60 is thereby deposited on the surface of the alloy plating layer 50.

Next, the tin plating layer 70 is formed on the surface of the nickel plating layer 60 by electroplating. Specifically, the component body 20 with the nickel plating layer 60 deposited thereon is immersed in a tin plating solution, and a prescribed current is applied. The tin plating layer 70 is thereby deposited on the surface of the nickel plating layer 60.

Each electrode portion 30 deposited by the electrode portion deposition method described above was analyzed as follows.

First, as shown in FIG. 2, a cross section of the inductor component 10 taken perpendicular to an end face on the first end side was observed under an SEM (scanning electron microscope) to obtain a cross-sectional image. EDX spectrometry (energy dispersive X-ray spectrometry) was performed on the observed SEM image to analyze the composition of each layer. According to the EDX analysis, the base electrode 40 was found to contain silver, and part of the base electrode 40 located on the side toward the alloy plating layer 50 was found to contain tin. The alloy plating layer 50 was found to contain nickel and tin, and the molar ratio of nickel in the alloy plating layer 50 was found to be 2.5 times or more and 3.5 times or less (i.e., from 2.5 times to 3.5 times) of the molar ratio of tin.

To identify the compound forming the alloy plating layer 50, powder X-ray diffraction analysis was performed in addition to the EDX analysis to analyze the crystal structures of materials contained in each electrode portion 30. Specifically, an electrode portion 30 of the inductor component 10 was shaved, and the obtained powdery specimen was irradiated with X rays to detect diffraction peaks. Next, for each of the elements contained in each layer and identified by the EDS analysis and compounds formed of these elements, diffraction peaks thereof were searched in a database obtained in advance. The diffraction peaks detected were compared with the diffraction peaks in the database to identify compounds contained in the powder. It was therefore found that the compound forming the alloy plating layer 50 was $Ni_3Sn$.

For example, to identify the compound forming the alloy plating layer 50, it is preferable to prepare a powdery sample such that the materials of other layers are not mixed into the sample. However, when it is difficult to shave only the alloy plating layer 50, the materials of other layers may be mixed into the sample. In this case, the compound forming the alloy plating layer 50 can be identified by analyzing diffraction peaks obtained by removing peaks of the base electrode 40, the nickel plating layer 60, and the tin plating layer 70 from the diffraction peaks obtained by irradiating the sample with X-rays. As described above, the diffraction peaks of the alloy plating layer 50 are selected by removing the peaks of the base electrode 40, the nickel plating layer 60, and the tin plating layer 70 from the diffraction peak obtained by irradiating the sample with X-rays. In this case, the presence or absence of an additional compound can be determined by checking whether diffraction peaks other than the diffraction peaks of $Ni_3Sn$ are present.

An SEM image of a cross section perpendicular to the deposition direction of the layers shown in FIG. 2 was taken at a magnification of 10000×. The dimension of each of the layers in their deposition direction in the SEM image was measured at three points, and the average of these values was used as the thickness.

Delamination in each of the electrode portions 30 of the inductor component 10 was evaluated as follows.

Figure 3:
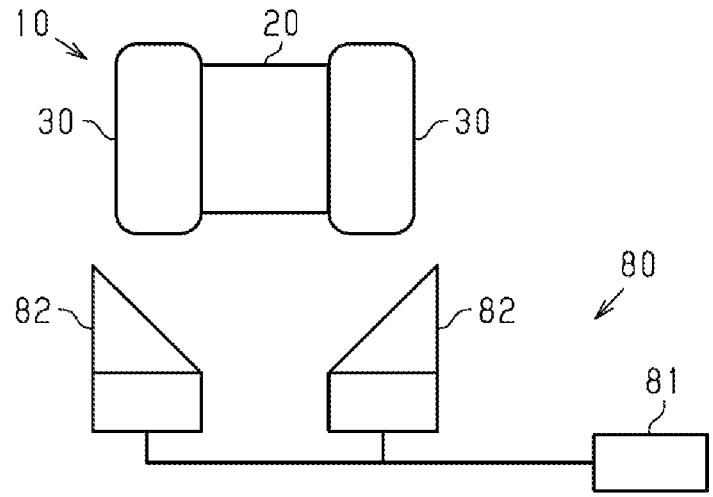
FIG. 3 is an illustration of a delamination evaluation method.

As shown in FIG. 3, to measure characteristics, i.e., the inductance and Q value, of the inductor component 10, a measurement device 80 is used. Two measurement terminals 82 are connected to a main body 81 of the measurement device 80. The measurement terminals 82 each have a rod-like overall shape and extend parallel to each other. End faces of the measurement terminals 82 are inclined surfaces inclined such that the spacing between the measurement terminals 82 increases toward their ends.

Figure 4:
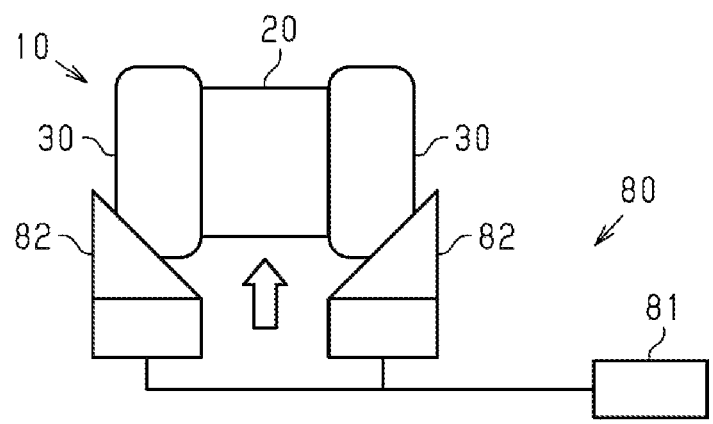
FIG. 4 is an illustration of the delamination evaluation method.

As shown in FIG. 4, when the inductance and Q value of the inductor component 10 are measured, the two measurement terminals 82 are brought into contact with the respective electrode portions 30 of the inductor component 10 with a prescribed pressing force to measure the inductance and the Q value. Specifically, the measurement terminals 82 are pressed against the respective electrode portions 30 to such an extent that surfaces of the electrode portions 30 that are in contact with the measurement terminals 82 are deformed, and a prescribed current is caused to flow between the measurement terminals 82 from the main body 81.

Figure 5:
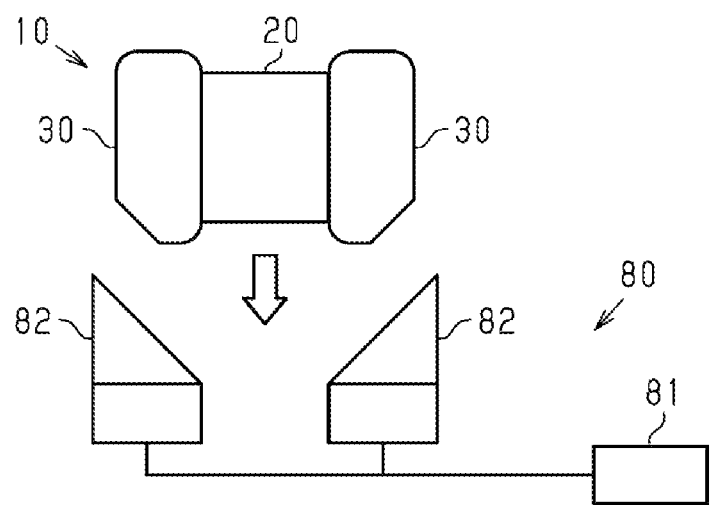
FIG. 5 is an illustration of the delamination evaluation method.

As shown in FIG. 5, after completion of the measurement of the inductance and the Q value, the measurement terminals 82 are separated from the inductor component 10. Then the presence or absence of delamination in the electrode portions 30 of the sample subjected to the measurement of the inductance and the Q value is determined by observing a cross section of the sample. Specifically, a cross section of the inductor component 10 subjected to the measurement of the above physical properties is observed. In this case, the cross section observed is a surface that passes through the longitudinal center axis of the inductor component 10 and is parallel to the direction of pressing by the measurement terminals 82.

The test in which the presence or absence of delamination in the electrode portions 30 is determined by cross-sectional observation will be described.

First, inductor components 10 including respective alloy plating layers 50 with different thicknesses were prepared. Specifically, a prescribed number N of inductor components 10 were prepared for each thickness, and their inductance and Q value were measured. Then the presence or absence of delamination in the electrode portions 30 was evaluated for each of the samples subjected to the measurement of the inductance and Q value. As shown in FIG. 6, when the thickness of the alloy plating layer 50 is 0 μm, i.e., when no alloy plating layer 50 is present and each electrode portion 30 has a three-layer structure including the base electrode 40, the nickel plating layer 60, and the tin plating layer 70, a delamination failure ratio indicating the ratio of delaminated samples is 23%. However, when the thickness of the alloy plating layer 50 in the present embodiment is 0.3 μm, 0.4 μm, 0.8 μm, or 1.1 μm, the delamination failure ratio is 0%. It was therefore found that, when the alloy plating layer 50 is formed, delamination in the electrode portions 30 can be prevented. As can be seen, when the thickness of the alloy plating layer 50 is 0.3 μm or more, no delamination in the electrode portions 30 occurs at all.

Next, the operation of the above embodiment will be described.

In the above embodiment, the alloy plating layer 50 is deposited on the surface of each base electrode 40, and the nickel plating layer 60 is deposited on the surface of the alloy plating layer 50. The adhesion of nickel in the nickel plating layer 60 to silver or copper in the base electrode 40 is relatively low. Tin contained in the alloy plating layer 50 is thought to easily diffuse into the base electrode 40 containing silver or copper. Tin is relatively easily alloyed with nickel, and the compatibility between the alloy plating layer 50 containing a relatively large amount of nickel and the nickel plating layer 60 formed of nickel is relatively high, so that the adhesion therebetween is high accordingly. Therefore, since the alloy plating layer 50 is interposed between the base electrode 40 and the nickel plating layer 60, the area of the interface between nickel and silver or copper at which the adhesion therebetween is relatively low is reduced.

Next, the effects of the above embodiment will be described.

(1) When the inductance and Q value of the inductor component 10 are measured, the measurement terminals 82 are brought into contact with the respective electrode portions 30 of the inductor component 10 with a prescribed pressing force as described above. Therefore, during the measurement, stress is applied to the inductor component 10 accordingly.

Suppose that each of the electrode portions 30 of the inductor component 10 does not include the alloy plating layer 50 and has a three-layer structure including the base electrode 40, the nickel plating layer 60, and the tin plating layer 70. In this case, delamination of the nickel plating layer 60 and the tin plating layer 70 may be found after the measurement of the characteristics using the measurement device 80, as shown in FIG. 6. In the above embodiment, the alloy plating layer 50 is interposed between the base electrode 40 and the nickel plating layer 60. Therefore, the nickel plating layer 60 can be deposited on the front side of the base electrode 40 with no interface between the base electrode 40 and the nickel plating layer 60. Since the adhesion of the alloy plating layer 50 to the base electrode 40 and also the adhesion of the alloy plating layer 50 to the nickel plating layer 60 are appropriately high, delamination can be prevented.

(2) In the present embodiment, the molar ratio of nickel in the alloy plating layer 50 is about 2.5 times or more and about 3.5 times or less (i.e., from about 2.5 times to about 3.5 times) of the molar ratio of tin. This compositional ratio of nickel to tin allows the nickel-tin alloy to be produced relatively easily. The amount of nickel contained is appropriate, and this may be the reason that the adhesion to the nickel plating layer 60 is improved.

(3) In the present embodiment, the alloy plating layer 50 is formed of $Ni_3Sn$. The alloy plating layer 50 is formed of the alloy of nickel and tin, and the main components are nickel and tin. Therefore, an excessively large amount of impurities are not contained, and their influence on the adhesion between the base electrode 40 and the nickel plating layer 60 is small.

(4) In the present embodiment, the thickness of the alloy plating layer 50 is about 0.3 μm or more. Therefore, when stress is applied to the inductor component 10 during the measurement of the characteristics, the delamination failure ratio can be significantly reduced.

(5) In the present embodiment, each base electrode 40 contains silver. Suppose that the nickel plating layer 60 is deposited on the surface of the silver base electrode 40. In this case, the nickel plating layer 60 particularly easily delaminates from silver. It is therefore preferable to use the alloy plating layer 50.

(6) In the present embodiment, each base electrode 40 contains glass. This causes the base electrode 40 to have an irregular surface. Therefore, the area of contact between the base electrode 40 and the alloy plating layer 50 is large, and the adhesion of the alloy plating layer 50 to the base electrode 40 is increased.

(7) In the present embodiment, part of each base electrode 40 that is located on the side toward the alloy plating layer 50 contains tin. Therefore, the adhesion between the base electrode 40 and the alloy plating layer 50 is further increased. This may be because tin diffused from the alloy plating layer 50 into the base electrode 40 increases the adhesion between the base electrode 40 and the alloy plating layer 50.

(8) In the present embodiment, the tin plating layer 70 is deposited on the surface of the nickel plating layer 60. Therefore, solder wettability when the inductor component 10 is soldered is high.

The above embodiment can be modified as follows. The above embodiment and the following modifications can be combined so long as no technological contradiction arises.

In the above embodiment, the electronic component is not limited to the inductor component 10. The electronic component may be, for example, a capacitor component or a thermistor component. It is only necessary that the electronic component include the component body 20 with at least surfaces of the electrode portions 30 exposed.

In the above embodiment, the inductor wiring line may be any wiring line so long as magnetic flux is generated by a current passing through the wiring line and the inductor component can thereby have inductance.

In the above embodiment, the shape of the component body 20 is not limited to that in the example in the above embodiment. The component body 20 may be substantially cylindrical, polygonal, or spherical.

In the above embodiment, the material of the component body 20 is not limited to that in the example in the above embodiment. The material may be, for example, non-magnetic glass, aluminum, or resin.

In the above embodiment, the component body 20 is not limited to the sintered body and may be a cured resin body. When the component body 20 is the sintered body, the adhesion to the base electrodes 40 is improved.

In the above embodiment, the base electrodes 40 may not be deposited on the surface of the component body 20. The base electrodes 40 may be embedded in the component body 20 so long as the surface of each base electrode 40 is exposed from the component body 20. In this case, the base electrodes 40 can have any shape.

In the above embodiment, the positions at which the electrode portions 30 are deposited are not limited to those in the example in the above embodiment. For example, the electrode portions 30 may be deposited only on the respective end faces on the first and second end sides in the longitudinal direction, or an L-shaped electrode portion 30 extending from the end face on the first end in the longitudinal direction to one of four faces connected to the end face may be used. This also applies to the case where the base electrodes 40 are embedded in the component body 20 and the surfaces of the base electrodes 40 are exposed from the component body 20.

In the above embodiment, the material of the base electrodes 40 is not limited to silver. For example, the material of the base electrodes 40 may be an alloy of silver and palladium or may be copper as described above. The material of the base electrodes 40 may contain no glass.

In the above embodiment, tin may not be contained in part of each base electrode 40 that is located on the side toward the alloy plating layer 50. It is preferable that tin diffuses into the base electrodes 40 because the adhesion can be improved. However, even when each base electrode 40 is formed entirely of silver and the alloy plating layer 50 is deposited on silver, the effect of preventing delamination can be obtained.

In the above embodiment, the base electrodes 40 are formed by coating the first and second end portions of the component body 20, followed by baking treatment. However, first, the conductive paste may be applied to the first end portion of the component body 20 and then subjected to baking treatment, and then the conductive paste may be applied to the second end of the component body 20 and subjected to baking treatment.

In the above embodiment, $Ni_3Sn$ in the alloy plating layer 50 is formed by heat treatment in the process for producing the inductor component 10. However, $Ni_3Sn$ may be formed during the formation of the alloy plating layer 50.

In the above embodiment, the alloy plating layer 50 may contain $Ni_3Sn$ and an additional alloy. For example, the alloy plating layer 50 may contain, in addition to $Ni_3Sn$, an alloy with a different compositional ratio.

In the above embodiment, the alloy forming the alloy plating layer 50 is not limited to $Ni_3Sn$ and may be another alloy of nickel and tin. In addition to nickel and tin, an additional element may be contained. Even when an additional element is contained in addition to nickel and tin, the molar ratio of nickel in the alloy plating layer 50 may be about 2.5 times or more and about 3.5 times or less (i.e., from about 2.5 times to about 3.5 times) of the molar ratio of tin.

In the above embodiment, the thickness of the alloy plating layer 50 is not limited to the thickness in the example in the above embodiment. For example, even when the thickness of the alloy plating layer 50 is less than about 0.3 μm, the delamination failure ratio can be smaller than that when the thickness of the alloy plating layer 50 is about 0.0 μm. For example, when the thickness of the alloy plating layer 50 is about 5.0 μm or less, the alloy plating layer 50 is appropriately thin, and an excessive increase in the time required for the production step of depositing the alloy plating layer 50 can be prevented.

In the above embodiment, the thickness of the nickel plating layer 60 is not limited to the thickness in the example in the above embodiment. When the thickness of the nickel plating layer 60 is about 2.5 μm or more and about 7.2 μm or less (i.e., from about 2.5 μm to about 7.2 μm), melting of each base electrode 40 when the tin plating layer 70 is soldered can be prevented, and an excessive increase in the size of the inductor component 10 is prevented.

In the above embodiment, instead of the tin plating layer 70, a gold plating layer may be deposited on the surface of the nickel plating layer 60, or a plating layer formed of an alloy containing tin and gold may be used.

The method for evaluating delamination in the electrode portions 30 is not limited to the above-described exemplary method, and another evaluation method may be used. For example, delamination can be evaluated by heating the inductor component 10 to generate thermal stress and then observing a cross section of the inductor component 10. The effect of preventing delamination in the electrode portions 30 is effective not only in the case where the electrical characteristics are measured but also in other cases.

The compounds in the layers of the electrode portions 30 should be identified using the above-described measurement method. However, another method may be used only if the above measurement method cannot be used. For example, X-ray photoelectron spectroscopy (XPS) may be used to identify and quantify the compounds.

While some embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. An electronic component comprising:
   a component body;
   a base electrode that has a surface exposed from the component body and contains at least one of silver and copper;
   an alloy layer deposited directly on the surface of the base electrode; and
   a nickel layer deposited on a surface of the alloy layer, wherein the material of the alloy layer is an alloy containing $Ni_3Sn$, an entire bottom surface of the base electrode is in direct contact with the component body, and the base electrode contains glass.

2. The electronic component according to claim 1, wherein the alloy layer has a thickness of 0.3 μm or more.

3. The electronic component according to claim 1, wherein the base electrode contains silver.

4. The electronic component according to claim 1, wherein in the base electrode, at least part on the side toward the alloy layer contains tin.

5. The electronic component according to claim 1, further comprising:

a tin layer or a gold layer that is deposited on a surface of the nickel layer.

6. The electronic component according to claim 2, wherein the base electrode contains silver.

7. An electronic component comprising:

a component body;

a base electrode that has a surface exposed from the component body and contains at least one of silver and copper;

an alloy layer deposited directly on the surface of the base electrode; and a nickel layer deposited on a surface of the alloy layer, wherein the material of the alloy layer is an alloy containing nickel and tin, where the molar ratio of the nickel in the alloy layer is from 2.5 times to 3.5 times of the molar ratio of the tin, an entire bottom surface of the base electrode is in direct contact with the component body, the base electrode contains glass, and in the base electrode, at least part on the side toward the alloy layer contains tin.

* * * * *